United States Patent Office 3,776,890
Patented Dec. 4, 1973

3,776,890
POLYAMIDES FROM 2-(4-AMINOCYCLOHEXYL)-1,1 - DIMETHYLETHYLAMINE OR 2-(4-AMINOPHENYL)-1,1-DIMETHYLETHYLAMINE
Lester Tsung-Cheng Lee, Parsippany, N.J., assignor to Allied Chemical Corporation, New York, N.Y.
No Drawing. Filed May 13, 1971, Ser. No. 143,186
Int. Cl. C08g 20/20
U.S. Cl. 260—78 R
6 Claims

ABSTRACT OF THE DISCLOSURE

Novel polyamides are prepared by polymerizing a diamine selected from the group consisting of 2-(4-aminocyclohexyl)-1,1-dimethylethylamine and 2 - (4 - aminophenyl)-1,1-dimethylethylamine with a dicarboxylic acid or derivative thereof. The diamines are also novel compounds and are prepared by reduction of 2-(4-nitrophenyl)-1,1-dimethyl-1-nitroethane. The polyamides are useful in forming fibers and films having excellent high temperature properties.

---

This invention provides two novel diamines and polyamides prepared therefrom.

The diamines have the formula

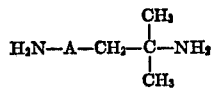

wherein A is p-phenylene or p-cyclohexylene. The diamines are derived from 2-(4-nitrophenyl)-1,1-dimethyl-1-nitroethane, which is a known compound disclosed in the Journal of the American Chemical Society, vol. 87, pp. 4520–4528 (1965).

The diamine wherein A is p-phenylene (2-(4-aminophenyl)-1,1-dimethylamine) is prepared from 2-(4-nitrophenyl)-1,1-dimethyl - 1 - nitroethane in accordance with conventional methods for preparing aromatic diamines from the corresponding aromatic dinitro compounds. A typical method of preparation comprises reacting 2-(4-nitrophenyl)-1,1-dimethyl - 1 - nitroethane in an inert solvent, such as ethanol, with hydrogen at a pressure of from about 30 to about 80 p.s.i.g. in the presence of a conventional hydrogenation catalyst, such as palladium supported on charcoal. The reaction is conveniently carried out at room temperature, but elevated temperatures, up to about 80° C., can be employed if desired.

The diamine wherein A is p-cyclohexylene (2-(4-amino-cyclohexyl)-1,1-dimethylethylamine) is prepared from 2-(4-aminophenyl) - 1,1 - dimethylethylamine in accordance with conventional methods for converting aromatic diamines to the corresponding saturated diamines. A typical method of preparation comprises reacting 2-(4-aminophenyl)-1,1-dimethylethylamine in an inert solvent, such as dioxane, with hydrogen at a pressure of from about 800 to 1500 p.s.i.g. in the presence of a conventional hydrogenation catalyst, such as ruthenium supported on carbon. The reaction is normally carried out at a temperature of from about 100° to 150° C. Of course, 2-(4-aminocyclohexyl) - 1,1 - dimethylethylamine can be prepared directly from 2-(4-nitrophenyl)-1,1 - dimethyl - 1-nitroethane in accordance with this method, although 2-(4 - aminophenyl) - 1,1 - dimethylethylamine would be formed as an intermediate.

Polyamides are prepared from the novel diamines of this invention by polymerization with a diacyl halide having the formula

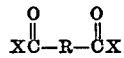

wherein R is a divalent organic radical and X represents a halogen, preferably chlorine or bromine, more preferably chlorine. The polymerization is conveniently carried out in accordance with conventional interfacial or solution polymerization techniques. For example, in a typical polymerization, a solution of the diacyl halide in an inert organic solvent is added to a vigorously stirred solution of the diamine in water or an inert organic solvent. The polymerization reaction proceeds rapidly at room temperature, but temperatures above or below room temperature can be used if desired. The resultant polyamide is recovered from the reaction mixture in accordance with conventional methods, such as by filtration.

Polyamides can also be prepared from 2-(4-aminocyclohexyl)-1,1-dimethylethylamine in accordance with conventional melt polymerization techniques by first forming the salt of the amine and a dicarboxylic acid having the formula HOOCRCOOH wherein R is as defined herein, and then polymerizing the salt at an elevated temperature, such as between about 225° and 350° C., until a polymer of film-forming molecular weight is obtained. The salt is readily formed by combining a substantially 1:1 molar ratio of the diamine and the diacid in an inert solvent, such as absolute ethyl alcohol.

In the dicarboxylic acids and derivatives thereof employed in this invention, the organic diradical designated "R" is preferably an aliphatic, aromatic, or aliphatic-aromatic diradical or substituted derivative of such diradicals. Suitable aliphatic diradicals include straight chain alkyl diradicals, branched chain alkyl diradicals and cycloalkyl diradicals. The aliphatic chain can contain hetero atoms, such as sulfur or oxygen, and can also bear substituents, such as halogen atoms, which are nonreactive under the conditions of polymerization. Suitable aromatic diradicals include phenylene, a fused aromatic group, such as naphthylene, or two or more linked aromatic nuclei, such as represented by biphenylene, bisphenylenemethane, bisphenylenepropane, bisphenylenesulphone, bisphenylene ether, and the like. In addition, any of the aromatic groups may bear one or more nuclear substituents, such as lower alkyl groups or halogen atoms, which are nonreactive under the conditions of polymerization. The diradical preferably contains from 2 to 18 carbon atoms, more preferably 2 to 12 carbon atoms. Particularly suitable dicarboxylic acids and derivatives thereof include those wherein R is phenylene or has the formula —(CH$_2$)$_m$— wherein $m$ is an integer from 2 to 12.

Mixtures of dicarboxylic acids or derivatives thereof can also be used in this invention to produce polymers having recurring units wherein the group represented by R in the general formula for the polymers refers to two or more different diradicals.

Thus, the novel polyamides of this invention have recurring units of the formula

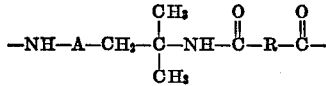

wherein A and R are as defined herein.

The polyamides of this invention are characterized by having excellent high temperature properties. In particular, the polyamides have high glass transition temperatures and yet are melt processable. In general, a high glass transition temperature is desirable in that it reflects the resistance of the polymer to deformation at temperatures up to the glass transition temperature. For example, fibers of a polymer having a high glass transition temperature have greater resiliency and resistance to wrinkling. A notable feature of the polyamides of this invention is their high glass transition temperatures coupled with their comparatively low melting points. A low melting point is desirable for ease in melt processing. Hence, a high ratio of glass transition temperature to melting point, $T_g/T_m$ (the temperatures being expressed in degree Kelvin), is especially desirable. The polyamides of this invention are characterized by having exceptionally high $T_g/T_m$ ratios. The ratios are normally above 0.7; and in the preferred embodiments the ratio is at least 0.75 and preferably is 0.8 or greater.

The high $T_g/T_m$ ratios of the polymers of this invention represent a surprising phenomenon. To explain this phenomenon, it is theorized that the high ratios are due to the presence of the gem-dimethyl groups in the diamine moiety. This theory is supported by the fact that the polymer of this invention wherein A is p-phenylene and R is n-butylene has a $T_g/T_m$ ratio of 0.80 whereas the corresponding polymer having hydrogen in place of the gem-dimethyl groups has a $T_g/T_m$ ratio of only 0.66 ($T_g$=115° C., $T_m$=312° C.). Accordingly, similar diamines having gem-dimethyl groups would also be expected to produce polymers having high $T_g/T_m$ ratios.

This invention is further illustrated by the following examples. The products in the examples were identified in accordance with conventional modern analytical techniques.

EXAMPLE 1

Preparation of 2-(4-aminophenyl)-1,1-dimethyl-ethylamine

Fifteen grams of 2-(4-nitrophenyl)-1,1-dimethyl-1-nitromethane, dissolved in 95% ethanol, was hydrogenated in the presence of one gram of 5% palladium supported on charcoal. The hydrogenation was carried out at 40° C. and at 60 p.s.i.g. After hydrogen uptake had ceased, the reaction mixture was filtered. The filtrate was distilled under reduced pressure to remove the solvent and then fractionally distilled to produce 12.5 grams of 2-(4-aminophenyl)-1,1-dimethylethylamine (boiling point 97% C. at 0.4 mm. Hg).

EXAMPLES 2–7

Preparation of polyamides from 2-(4-aminophenyl)-1,1-dimethylethylamine

Polyamides were prepared from 2-(4-aminophenyl)-1,1-dimethylethylamine by polymerization with various diacyl chlorides in accordance with conventional interfacial polymerization techniques. The glass transition temperature ($T_g$), melting point ($T_m$), $T_g/T_m$ ratio (based on degrees Kelvin), reduced viscosity (0.5% in m-cresol at 25° C.) and crystallinity (X-ray diffraction) of the polyamides are reported in Table I.

The polyamides were prepared in accordance with the following typical method. A solution of 2.96 grams of adipyl chloride in 60 ml. of 1,2-dichloroethane was added to a vigorously stirred solution of 2.66 grams of 2-(4-aminophenyl)-1,1-dimethylethylamine. A polymer formed immediately and after 5 minutes the reaction mixture was poured into ice water. The polymer, which was recovered by filtration, washed and dried, weighed 4.7 grams (85% yield).

TABLE I

| Diacyl chloride (R) | $T_g$ (° C.) | $T_m$ (° C.) | $T_g/T_m$ | Reduced viscosity | Crystallinity (percent) |
|---|---|---|---|---|---|
| —(CH$_2$)$_2$— | 158 | 250 | 0.82 | 0.37 | >20 |
| —(CH$_2$)$_4$— | 130 | 235 | 0.80 | 0.57 | >33 |
| —(CH$_2$)$_8$— | 92 | 205 | 0.76 | 0.61 | >33 |
| phenylene | 175 | 360 | 0.71 | 0.41 | >35 |
| (80 wt. percent) phenylene / (20 wt. percent) —(CH$_2$)$_4$— | | | | | |
| (50 wt. percent) —(CH$_2$)$_4$— / (50 wt. percent) phenylene | 146 | 240 | 0.82 | 0.49 | 15 |
| phenylene | 150 | 280 | 0.76 | 0.43 | 10 |

EXAMPLE 8

Preparation of 2-(4-aminocyclohexyl)-1,1-dimethyl-ethylamine

Ten grams of 2-(4-nitrophenyl)-1,1-dimethyl-1-nitroethane, dissolved in dioxane, was hydrogenated in the presence of 0.8 gram of 10% ruthenium on carbon at 120° C. and 1600 p.s.i.g. for 7 hours. The reaction mixture was filtered and the filtrate was fractionally distilled to produce 7 grams of 2-(4-aminocyclohexyl)-1,1-dimethylethylamine (boiling point 78° C. at 0.2 mm. Hg).

EXAMPLE 9

Preparation of polyamide from 2-(4-aminocyclohexyl)-1,1-dimethylamine

A polyamide was prepared from 2-(4-aminocyclohexyl)-1,1-dimethylamine by polymerization with adipyl chloride in accordance with the interfacial polymerization technique employed in Examples 2–7. The properties of the polyamide are tabulated below:

$T_g$, ° C. _____ 80
$T_m$, ° C. _____ 200
$T_g/T_m$ _____ 0.75
Reduced viscosity _____ 0.19
Crystallinity, percent _____ >33

I claim:

1. A polyamide of film-forming molecular weight consisting essentially of recurring units of the formula

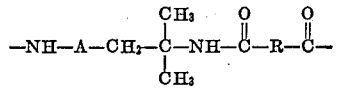

wherein A is p-phenylene or p-cyclohexylene and R is an aliphatic, aromatic, or aliphatic-aromatic hydrocarbon radical having from 2 to 18 carbon atoms.

2. The polyamide of claim 1 having a ratio of glass transition temperature to melting point, expressed in degrees Kelvin, of at least 0.7.

3. The polyamide of claim 2 wherein R is phenylene or has the formula —(CH$_2$)$_m$— wherein $m$ is 2 to 12.

4. The polyamide of claim 3 having a ratio of glass transition temperature to melting point, expressed in degrees Kelvin, of at least 0.75.

5. The polyamide of claim 3 having a ratio of glass transition temperature to melting point, expressed in degrees Kelvin, of at least 0.8.

6. The polyamide of claim 5 wherein A is p-phenylene and R is phenylene or has the formula —(CH$_2$)$_m$— wherein $m$ is 2 to 4.

References Cited

UNITED STATES PATENTS 3,203,993  8/1965  Abramo et al. _____ 260—78 R

HAROLD D. ANDERSON, Primary Examiner

U.S. Cl. X.R.

260—47 CZ, 33.4 R, 563 C, 570.8 R